United States Patent [19]

Higgins et al.

[11] 3,873,734
[45] Mar. 25, 1975

[54] METHOD OF PRODUCING A PELLETED SLOW-RELEASE NPN FEED FOR RUMINANTS

[75] Inventors: John Francis Higgins, Schuyler, Nebr.; Dale Richard McDonald, Sterling, Colo.; Marvin Ardell Hanson, Ceresco, Nebr.; William Percy Moore, Chester, Va.

[73] Assignee: Allied Chemical Corporation, New York, N.Y.

[22] Filed: Jan. 28, 1974

[21] Appl. No.: 437,435

Related U.S. Application Data

[63] Continuation of Ser. No. 223,696, Feb. 4, 1972, abandoned, which is a continuation-in-part of Ser. No. 163,305, July 16, 1971, abandoned.

[52] U.S. Cl.................. 426/69, 426/210, 426/373, 426/374, 426/807, 71/11, 71/29
[51] Int. Cl........................... A23k 1/14, A23k 1/22
[58] Field of Search .......... 426/2, 69, 74, 807, 210, 426/213, 364, 373, 374, 377, 456; 71/11, 25, 26, 28, 29

[56] References Cited
UNITED STATES PATENTS

| | | | |
|---|---|---|---|
| 2,861,886 | 11/1958 | Colby | 99/2 |
| 3,050,383 | 8/1962 | Wilson | 71/11 |
| 3,073,693 | 1/1963 | Nielsson et al. | 71/29 |
| 3,490,912 | 1/1970 | Freese | 99/2 ND |
| 3,512,986 | 5/1970 | Snyder | 426/2 |
| 3,655,395 | 4/1972 | Karnemaat | 71/28 |
| 3,677,767 | 7/1972 | McNeff | 99/6 |
| 3,733,203 | 5/1973 | Steen | 71/26 |

FOREIGN PATENTS OR APPLICATIONS

| | | | |
|---|---|---|---|
| 1,002,198 | 8/1965 | United Kingdom | 426/69 |
| 1,104,934 | 3/1968 | United Kingdom | 99/2 ND |

Primary Examiner—A. Louis Monacell
Assistant Examiner—Curtis P. Ribando
Attorney, Agent, or Firm—Fred L. Kelly

[57] ABSTRACT

An aqueous liquid feed supplement containing superphosphoric acid or ammoniated superphosphoric acid, a water-soluble sulfate and urea is admixed with a solid ruminant feedstuff containing polysaccharides, such as fresh or suncured alfalfa or corn. The mixture is then dehydrated in a rotary dryer with temperatures and retention times closely controlled to remove most of the water but not enough to destroy the valuable natural amino acids, vitamins, and other growth factors. The partially dried supplemented feed material is then made into pellets which have excellent storage properties. Moreover, the pelleted product contains 50 to 90 percent of the total nitrogen in the form of water-insoluble, slow-release nitrogen which can be fed to ruminants with a high degree of safety. The present invention thus provides a practical and economical way of utilizing urea in ruminant feeds while at the same time minimizing its toxic propensities.

6 Claims, 1 Drawing Figure

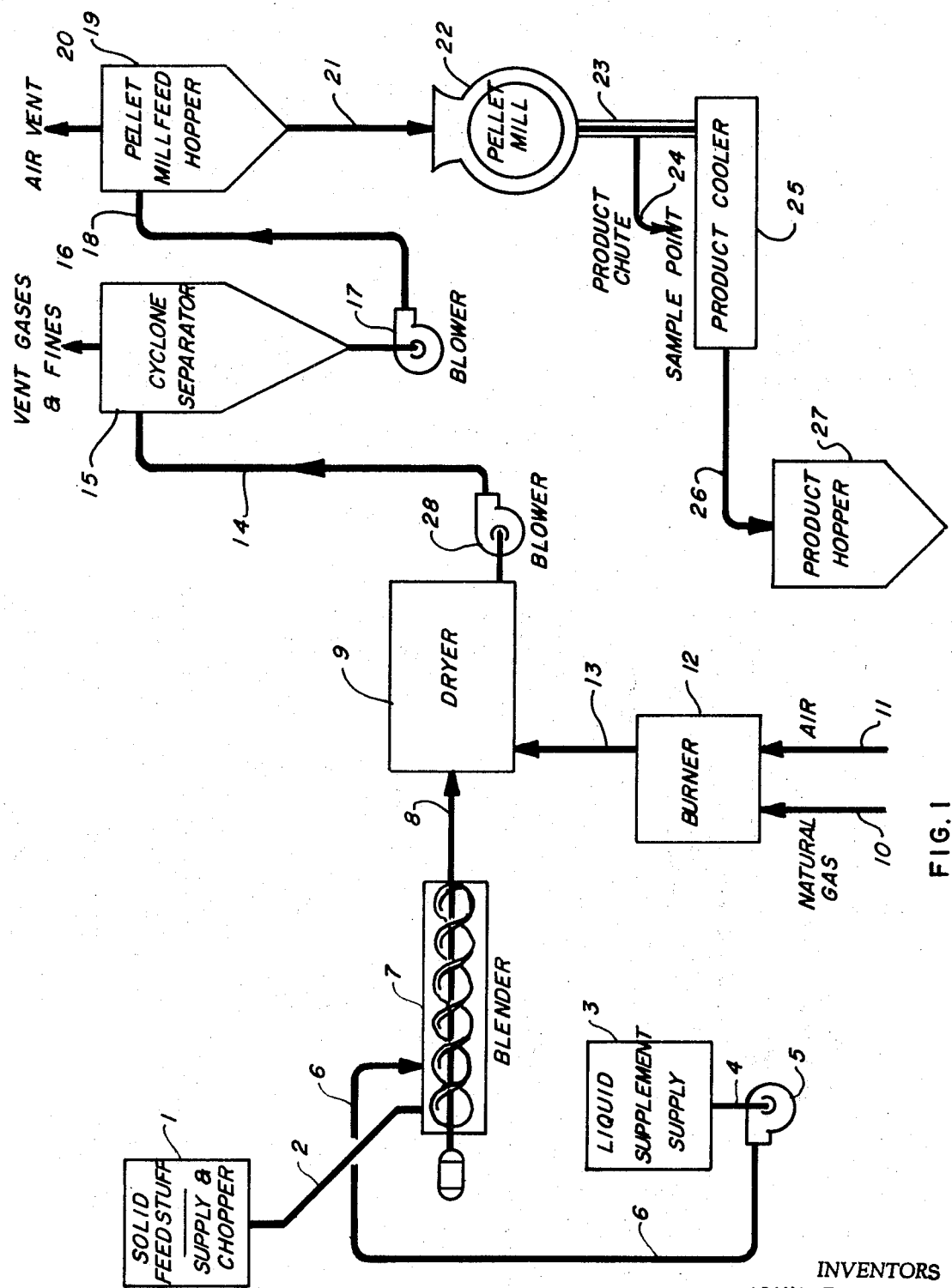

3,873,734

METHOD OF PRODUCING A PELLETED SLOW-RELEASE NPN FEED FOR RUMINANTS

CROSS REFERENCES TO RELATED APPLICATIONS

This is a continuation of application Ser. No. 223,696, filed Feb. 4, 1972, which is a continuation-in-part application Ser. No. 163,305, filed July 16, 1971 both now abandoned.

BACKGROUND OF THE INVENTION

Farm animals are commonly grouped into two classifications: ruminant and monogastric. Ruminant animals, which include cattle and sheep, have a complex stomach of several compartments. The first stomach, lying next to the reticulum, is known as the rumen.

It is well known that ruminant animals have the unique ability of utilizing nonprotein nitrogenous compounds such as urea, as well as phosphorus and sulfur compounds such as ammonium phosphates and ammonium sulfate. This is accomplished by the symbiotic relationship between microorganisms that multiply in the rumen and reticulum of the ruminant animals, which actually utilize the compounds and convert them into organisimal material that can in turn be digested and absorbed by the ruminant.

As a nonproteinaceous source of nitrogen, urea is attractive in feeding ruminants because it represents a concentrated and economical form of nitrogen. Pure urea contains about 46.5 percent nitrogen, but the amount that can safely be incorporated in ruminant feeds is limited by the fact that it possesses a definite toxicity limit toward ruminants. Accordingly, the art has long sought a practical and economical way of utilizing urea in animal feeds while at the same time minimizing its toxic propensities.

Many free-choice feed supplements for ruminant animals are known which contain nitrogen, phosphorus and sulfur nutrients and a liquid carrier such as water and molasses. Control of toxicity in free-choice feeding is a problem but may be accomplished by mechanically metering or weighing each day the supplement to be fed to the livestock.

Ruminant feed supplements can be conveniently incorporated into ruminant feeds for use in meal or more desirably in compressed shaped form, such as blocks, briquettes, pellets and the like. Pelleting operations are performed using a standard extrusion pelleting machine. However, the incorporation of hygroscopic supplements such as urea into ruminant feeds normally leads to mixes and finished pellets having poor storage characteristics. Often it is difficult to remove such products from bulk bins because of caking and resulting bin sets. It is known that the caking tendency can be somewhat reduced by additional drying of the feeds, but this method frequently results in dusty products. U.S. Pat. No. 3,490,912 discloses admixing a solution of urea with a solid absorbent feedstuff, drying the mixture, and pelleting the dried urea-containing feedstuff. Unfortunately, the resulting pellets have relatively poor crushing strength. Thus, there is a present need for improvement in such formulations. Also, as presently utilized in animal feeds, urea must be supplied in limited amounts, for if too much is included in the feed, or if it is not well blended with the other ingredients, digestive or other disturbences may result which may even be severe enough to cause death.

SUMMARY OF THE INVENTION

It is an object of this invention to provide a process for the production of a pelleted ruminant feedstuff having high nutritional value and improved storage characteristics.

It is another object of this invention to provide a process for the production of a pelleted ruminant feedstuff wherein the resulting pellets have improved crushing strength.

Another object of this invention is to provide a process for the production of pelleted ruminant feed-stuff whereby the pelleting rate is substantially increased.

Still another object of this invention is to provide a method of producing a pelleted ruminant feedstuff containing water-insoluble slow-release nitrogen, which can be fed to ruminates with a high degree of safety.

Yet another object of this invention is to provide an improved ruminant feed composition that releases nitrogen in the rumen in a slow and controlled manner for safe and efficient use by the animal.

In accordance with the invention there are provided novel compositions for the feeding of ruminants in which urea is present either wholly or partly in chemical combination with organic nutrients containing polysaccharides, the term "polysaccharides" being defined as those carbohydrates which are more complex than monosaccharides. This novel concept has the twofold advantage of introducing into the feed composition urea nitrogen in a form which has minimal or no toxicity, while simultaneously providing important nutrients in a concentrated and readily assimilable form to the animal. By providing a new and safe form of urea the invention permits the administration of increased amounts of urea without danger of harmful side effects.

In accordance with the invention, we provide a process for preparing at an increased pelleting rate a pelleted ruminant feedstuff containing slow-release nitrogen, having high nutritional value and improved storage characteristics, said process comprising the following steps:

a. admixing a liquid ruminant feed supplement and a solid ruminant feedstuff comprising polysaccharides, to impregnate the solid feedstuff with the liquid supplement, said liquid supplement comprising an aqueous solution of urea, a water soluble sulfate, and superphosphoric acid or ammoniated superphosphoric acid, providing an acid catalyst for hydrolysis of the polysaccharides to form carbonyl groups reactive to urea;

b. drying and reacting said impregnated solid feedstuff at a temperature within the range 160° to 290°F. to obtain a dried impregnated solid feedstuff containing urea-polysaccharide adducts and at least about 5 percent water;

c. pelleting and agglomerating said dried impregnated solid feedstuff while maintaining the temperature thereof at least about 140°F.; and d. cooling the resulting pelleted product to ambient temperature. The pelleted product thus obtained normally has a total nitrogen content of about 2–10 percent with a water-insoluble nitrogen content of about 50 to 90 percent of the total nitrogen. The nitrogen may be determined to be either soluble or insoluble by AOAC tests (AOAC Official Methods of Analyses, Eleventh Edition, 1970, page 18).

In terms of ruminant nutrients, the pelleted product preferably contains about 25–60 percent protein equivalent. The protein equivalent of the product may be controlled by adjusting the proportion of the ruminant feed supplement admixed with the solid ruminant feedstuff.

Aqueous ammoniated superphosphoric acid for use in the process of the invention can be produced by evaporating aqueous wet process phosphoric acid to form superphosphoric acid, which is then ammoniated. Canadian Pat. No. 812,689, granted to Allied Chemical Corporation, relates to the concentration of wet-process phosphoric acid to produce superphosphoric acid, i.e., phosphoric acid containing polyphosphates.

The preferred aqueous ammoniated superphosphoric acid of this invention has a pH of from about 5 to 8, preferably about 6; a nitrogen content of from about 9 to 12 percent by weight, preferably from about 10 to 11 percent by weight; a total phosphorus content measured as $P_2O_5$ of from about 28 to 39 percent by weight, preferably about 34 to 38 percent by weight, and wherein polymeric phosphates represent from about 30 to 70 percent by weight, preferably from about 55 to 65 percent by weight, based on the weight of the total phosphorus content. The polymeric phosphates include pyrophosphates and polyphosphates.

An aqueous ammoniated superphosphoric acid having the following properties which will hereinafter be referred to as "Solution A", was found to be particularly useful for purposes of the present invention:

| | |
|---|---|
| Nitrogen | 10.1% by weight |
| Phosphorus (as $P_2O_5$) | 34.2% by weight |
| Trace Minerals | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific Gravity at 60°F. | 1.4 |
| Salting out temperature | ca. 0°F. |

Distribution as percent by weight of the ammonium phosphates of Solution A was about:

35 percent ammonium orthophosphate
51 percent ammonium pyrophosphate
8 percent ammonium tripolyphosphate
5 percent ammonium tetrapolyphosphate
1 percent higher ammmonium phosphates We have found that when the supplement-impregnated feedstuffs are dried and pelleted in accordance with the present invention, the product pellets that result have a hard, refractory appearance. It was also found that the instant process, including the supplement addition, surprisingly improves the strength and storage properties of the product. Thus, the product can be handled with all normal material handling techniques such as belt conveying, screw conveying, trucking, and shoveling without the problems of particle degradation and formation of dust in the work area. Further, the supplemented product has the nutrients so tightly bound that "bin set" from the migration of salts to the particle surface is completely eliminated.

We have also found that the product of the invention is an improved ruminant feed composition which releases nitrogen in a slow and controlled manner in the rumen of the animal. In effect, the process of the invention combines low-cost urea and natural ruminant feedstuffs containing polysaccharides into a valuable source of slow-release nitrogen which can be fed to ruminants with a high degree of safety. Moreover, the new product of the invention permits the use of more low-cost synthetic protein equivalent than previously has been considered practical.

While not wishing to be bound by any theory, applicants believe that the slow-release properties of the present product are achieved by chemical reaction of the urea with partially degraded, hydrolyzed polysaccharides formed under conditions of the process and by agglomeration of this combination into particles having substantial physical integrity by a polymer formed by reaction of the urea with reactive lower polysaccharides which constitute a concentrated carbonyl source. Applicants further believe that said reactions of urea with polysaccharides are catalyzed by acids and salts of strong acids and weak bases, e.g., superphosphoric acid, ammoniated superphosphoric acid, ammonium sulfate, etc.

Although the feed pellets are hardened by treatment with the ammonium polyphosphate-sulfate-urea liquor and the dusting tendency is decreased, the pellets still retain enough porosity to allow absorption of the extra medicinal and vitamin materials which are usually used to protect animals from diseases. The hardness of the pellets surprisingly does not prevent the degradation of the pellets in the rumen so that the large surface area of the original roughage is regenerated in the rumen and benefit from the roughage content of the feed is obtained by the ruminant.

Moreover, the supplement-impregnated feedstuffs on drying in accordance with the present invention, appear to provide lubrication that significantly increases pellet production rates. This improvement is particularly unexpected. While the mechanism by which the pelleting rate is increased is not known with certainty, it is suggested that the partially dried impregnated feedstuff is somewhat thermoplastic at the advanced temperatures normally used for pelleting.

BRIEF DESCRIPTION OF THE DRAWING

The accompanying drawing diagrammatically illustrates one preferred method of carrying out the operation of the present invention.

DESCRIPTION OF THE PREFERRED EMBODIMENT

The preferred process can be carried out using either superphosphoric acid or ammoniated superphosphoric acid; however, for convenience, the preferred practice of the invention will be discussed in terms of incorporation of a liquid supplement comprising primarily ammoniated superphosphoric acid, urea, ammonium sulfate and water, into a relatively non-absorbent feed material such as fresh or suncured alfalfa or corn. The resulting mixture is reacted and dehydrated in a rotary dryer with temperatures and retention times closely controlled to remove most of the water but not enough to destroy the valuable natural amino acids, vitamins, and other growth factors. Preferably, a minor proportion of water-soluble polysaccharides such as molasses is included in the formulation as a concentrated carbonyl source for binding. The partially dried supplemented feed materials are then made into pellets. We have found that a nutritionally uniform feed product can be produced from nutritionally variable natural feed materials, to give roughage, protein and minerals in an economically advantageous form.

Optimum conditions for successful production of ruminant feeds with high and constant nutritional value are as follows:

| Condition | Preferred |
|---|---|
| Supplement Composition | |
| Ammoniated Superphosphoric Acid (dry basis) | 15–25% (wt.) |
| Ammonium Sulfate | 4–8% (wt.) |
| Molasses (or other water-soluble polysaccharides) | 0–20% (wt.) |
| Urea | 20–30% (wt.) |
| Natural Feedstuff Base (containing water-soluble and water-insoluble polysaccharides) | Alfalfa, corn plant |
| Ratio Natural Base to Supplement | 6–10 lbs./lb. |
| Drying Temperature (actual temp. of solids) | 180–240°F. |
| Retention Time in Dryer | 5–60 min. |
| Water Content of Natural Feed | 25–75% (wt.) |
| Water Content of Finished Product | 6–12% (wt.) |
| Pellet Formation Temperature | 140–300°F. |
| Retention Time Before Pellet is Cooled | 1–60 min. |

Green corn is suitable as the corn forage, preferably cut at the early-dent stage.

It is generally accepted that non-protein nitrogen such as urea is best used in conjunction with protein nitrogen for best results in ruminant feeding. However, in accordance with the present invention, the proportion of urea to natural protein can be increased if desired because a significant proportion of the urea is converted to slow-release nitrogen which is nox-toxic to the ruminant. While corn forage or alfalfa is the preferred feedstuff as indicated above, absorbent feedstuffs may also be used to advantage in this invention. The following table lists other appropriate feedstuffs together with their protein values.

| Name | Nominal Protein Value |
|---|---|
| Dried Beet Pulp | 8.66 |
| Dried Molasses Beet Pulp | 10.83 |
| Dried Potato Pulp | 7.78 |
| Dried Citrus Pulp | 6.68 |

In accordance with one preferred embodiment of this invention, an aqueous supplement containing 15 to 25 percent by weight of ammoniated superphosphoric acid (dry basis), 4 to 8 percent by weight of ammonium sulfate, 0 to 20 percent by weight of molasses or other water-soluble polysaccharides and 20 to 30 percent by weight of urea is sprayed onto chopped or ground sun-dried alfalfa while the alfalfa is tumbled or mixed in suitable equipment such as a chip blender. The alfalfa and the supplement solution are preferably mixed at a sufficiently high temperature to maintain the urea in aqueous solution during the spraying and mixing operation; a temperature in the range 50°–100°F. is normally used depending on the concentration of the supplement solution. Spraying is continued until the mass contains up to 60 percent by weight protein equivalent, on a dry weight basis. The damp mass is dried at a temperature of 180°–240°F. A gas fired dryer is suitable equipment for the drying operation. Product temperature in the dryer should not exceed about 290° F. and is normally maintained in the range 180–240°F. during drying. Excessive drying temperatures may decompose part of the protein in the alfalfa. The impregnated alfalfa is dried within 5 to 60 minutes sufficiently to remove most of the water but not enough to destroy the valuable natural amino acids, vitamins and other growth factors, i.e., it is reduced to a dry, free-flowing material containing water at a level not less than about 6 percent and not more than about 12 percent water. During the drying, a significant proportion of the urea is reacted with partially hydrolyzed polysaccharides to form polysaccharide-urea adducts.

The thus prepared and dried impregnated alfalfa may be blended with water-soluble polysaccharides or other natural ruminant feeds but the water-soluble polysaccharides are generally added prior to drying. The dried impregnated alfalfa is preferably pelleted at a temperature within the range of about 200°–300°F., whereby the residual urea becomes more soluble in the water which is retained by the dried impregnated absorbent. Thus, the liquid phase of the material to be pelleted increases to at least about 16 percent by weight of the dried impregnated absorbent, thereby permitting increased pelleting rate. Further reaction of the urea with hydrolysed polysaccharides occurs during the pelleting operation at temperatures of say 140°–300°F. and pressures of 500–20,000 psig. While maintaining its temperature at 140°–300°F., the ruminant feed mixture is extruded through a die and broken into pellets. The amount of supplement in the overall formulation varies with the need for protein supplementation and may range from about 9 to 14 percent or more of the total feed. The pelleted ruminant feed mixture is preferably cooled to ambient temperature within about 1 to 60 minutes after pelleting. Some reaction of residual urea with polysaccharides continues after pelleting until the product is cooled. Pelleting may be effected by any of the conventional methods employing known hard pelleting equipment and pellets of various sizes, as desired, may be formed. In general, pellets ranging in size from 1/16 inch diameter to 1 inch diameter are employed.

The following examples are given for the purpose of further illustrating this invention. In these examples percentages are by weight. Solution A used in these examples is aqueous ammoniated superphosphoric acid having the composition described hereinabove.

EXAMPLE 1

This example is described with reference to FIG. 1. The example demonstrates the production of a cattle feed with uniform high nutritional value from alfalfa with variable nutritional quality.

Alfalfa in this example was harvested from several Nebraska fields in the summer and early fall and allowed to sun-dry prior to transportation to the feed production plant. The alfalfa was harvested from fields with high fertility and relatively low fertility, and at different times in the crop cycle. Alfalfa harvested from fields with low fertility and late in the crop cycle had lower nutritional value than that harvested under more advantageous conditions. The suncured alfalfa lots with varying nutritional values were transported to the feed plant for conversion into uniform ruminant feedstuffs suitable for use as a major ingredient in starter and feeder cattle rations.

With reference to FIG. 1, the alfalfa as received at the feed plant was dumped into the feedstuff supply and chopper 1 where the alfalfa was chopped and tramp material was removed. Composition of a typical sample of alfalfa hay was as follows:

| Component | Weight Percent |
| --- | --- |
| Protein | 15.1 |
| Moisture | 25.9 |
| Fat (Ether Extract) | 2.9 |
| Crude Fiber (polysaccharides) | 16.3 |
| Ash | 8.3 |

Mineral content of alfalfa hay was as follows:

| Component | Weight Percent |
| --- | --- |
| Phosphorus | 0.23 |
| Potassium | 2.10 |
| Sulfur | 0.10 |
| Calcium | 1.25 |
| Magnesium | 0.31 |
| Sodium | 0.07 |
| Iron | 0.04 |
| Chloride | 0.46 |

Plus smaller amounts of manganese, zinc, cobalt, copper and iodine.

Also included in the alfalfa hay fed were amino acids comprising as follows:

| Component | Weight Percent |
| --- | --- |
| Threonine | 0.8 |
| Tryptophan | 0.4 |
| Methionine | 0.2 |
| Lysine | 0.9 |
| Arginine | 0.7 |
| Glycine | 0.9 |
| Histidine | 0.4 |
| Isoleucine | 0.7 |
| Leucine | 1.3 |
| Phenylalanine | 0.7 |
| Tyrosine | 0.3 |
| Alanine | 0.8 |
| Aspartic Acid | 1.9 |
| Glutamic Acid | 1.8 |
| Proline | 0.6 |
| Serine | 0.6 |
| Valine | 0.8 |

The liquid supplement stored in liquid supplement supply 3 was made by mixing the following components at essentially ambient conditions to form a free flowing essentially clear solution from the following ingredients:

| Ingredients | Weight Percent In Mix |
| --- | --- |
| Solution A | 30.0 |
| Ammonium Sulfate, Crystals | 6.8 |
| Cane Molasses | 10.0 |
| Aqueous Urea Liquor (65% urea) | 39.5 |
| Water (total moisture 44.5%) | 13.7 |
|  | 100.0 |

Solution A, as described in detail hereinabove, is an aqueous ammoniated superphosphoric acid containing 10.1 percent N and 34.2 percent phosphate, as $P_2O_5$, prepared by the ammoniation of superphosphoric acid derived from wet process phosphoric acid. Of the phosphate present, 65 percent was in the polyphosphate form and 35 percent in the orthophosphate form.

The liquid feed supplement contained 100.0 percent protein equivalent and was composed as follows:

| Component | Weight Percent |
| --- | --- |
| Nitrogen | 16.4 |
| Protein equivalent | 100.0 |
| Phosphorus | 4.4 |
| Sulfur | 2.0 |

Also included were significant amounts of iron, aluminum, calcium and magnesium.

The chopped alfalfa was fed into blender 7 through line 2. The liquid supplement was fed into blender 7 through line 4, pump 5, and line 6. The feed plant was started at a rate of about 3 tons per hour of alfalfa and 700 pounds per hour of liquid supplement fed to the blender. The rate of supplement feed may be varied if required to maintain a protein equivalent of about 26 to 28 percent in product sampled at sample point 24, as estimated by nitrogen content. Product samples were withdrawn from sample point 24 at 5 minute intervals and analyzed to assure homogeneity of results. Analyses made on certain of these samples are stated as weight percent on protein equivalent, phosphorus, sulfur, and moisture with regard to time as follows:

| Time | Protein | Phosphorus | Sulfur | Moisture |
| --- | --- | --- | --- | --- |
| 5 min. | 28.3 | 0.72 | 0.29 | 8.0 |
| 25 min. | 26.4 | 0.74 | 0.30 | 8.1 |
| 75 min. | 27.1 | 0.71 | 0.32 | 8.4 |
| 100 min. | 27.1 | 0.69 | 0.32 | 8.6 |
| 120 min. | 26.3 | 0.71 | 0.31 | 8.6 |
| Average | 27.0 | 0.72 | 0.31 | 8.3 |

The moist impregnated alfalfa formed in blender 7 was fed through line 8 to a conventional rotary, gas fired dryer 9. Natural gas 10 was burned with air 11 in burner 12 and combustion gases were fed through line 13 to dryer 9. The dryer was suitably controlled to give a dried product temperature of about 180°F. and the resulting product contained about 8 percent water content. Retention time in the dryer was about 7 minutes. The dried impregnated alfalfa and spent heating gases were blown with air from dryer 9 through blower 28 and line 14 to a conventional cyclone separator 15 where vent gases and fines were separated through line 16. The residual dried impregnated alfalfa was then blown with air to pellet mill feed hopper 19 through blower 17 and line 18. Air was vented from feed hopper 19 through line 20. The dried impregnated alfalfa at about 70°F. was fed through line 21 to pellet mill 22, which was a conventional Sprout-Waldron pellet machine fitted with a ⅜-inch die. Pelleting temperature was about 145°F. in the die. The pelleted product at about 145°F. was passed through product chute 23 to a conventional cooler 25 where the pellets were cooled to ambient temperature within 1 to 4 minutes. The cooled pellets were then passed through line 26 to product hopper 27 where product wass stored until its use was desired.

The liquid supplement was fed for a test period of 120 minutes. Total amount of suncured alfalfa weighed into the sytem during the 120 minute test period was 11,804 pound. The amount of feed supplement used during the 120 minute test period was 1,396 pounds, as measured by decrease in feed tank level. The amount of pelleted supplemented ruminant feed collected in the product hopper (27) during the 120 minute test period was 11,275 pounds. A small amount of dust and fines was carried out of the system but was not a significant part of the product. Recovery of protein equivalent through the process was 95.8 percent. Analyses of several of the key amino acids were made on the product pellets to assure that no degradation had occurred in the process. Results were as follows:

| Component | Weight Percent |
|---|---|
| Threonine | 0.8 |
| Methionine | 0.2 |
| Lysine | 0.9 |
| Aspartic Acid | 1.9 |

The product pellets were also analyzed for certain metals with results as follows:

| Component | Weight Percent |
|---|---|
| Potassium | 2.00 |
| Calcium | 1.20 |
| Magnesium | 0.28 |
| Sodium | 0.07 |
| Iron | 0.06 |
| Chloride | 0.40 |

Pellets were tested for resistance to crushing by selecting pellets about ½ inch long. Diameter of all pellets extruded by the Sprout-Waldron machine was ⅜-inch. Crushing strength of the pellets was measured by placing a pellet on an aluminum plate located on a scale and applying pressure to the pellet with a smooth, flat aluminum plate until the pellet fractured. The pressure exerted on the scale at the time of cracking was recorded. Pressure was applied normal to the pellet diameter. Pellets made just before the addition of the supplement was started and 5 minutes after the addition of supplement was stopped were included in evaluations. Average values for 10 pellets from each sample were recorded as follows:

| Time of Sample | Weight Required to Crush — lbs. |
|---|---|
| 5 minutes before additive started | 71 |
| 5 minutes after additive started | 155 |
| 25 minutes after additive started | 154 |
| 75 minutes after additive started | 151 |
| 100 minutes after additive started | 151 |
| 120 minutes after additive started | 141 |
| 5 minutes after additive stopped | 84 |

The above noted increase in pellet strength with added supplement was accompanied by a decrease in dustiness, and a decrease in tendency for fraying at the place where the pellet was cut off by the machine.

EXAMPLE 2

At completion of the two hour test period of Example 1, the liquid supplement flow was stopped and the plant was operated for one hour without supplement to deplete the alfalfa supply. Then, feed to the plant was started from a new batch of alfalfa hay produced late in the growing season under conditions of only moderate fertility. This new batch of alfalfa hay was dumped into the feedstuff supply and chopper 1 and the plant continued to operate without shutdown.

Analysis of the alfalfa hay feed of this example was as follows:

| Component | Weight Percent |
|---|---|
| Protein | 11.3 |
| Moisture | 29.8 |
| Fat (Ether Extract) | 1.7 |
| Crude Fiber (polysaccharides) | 19.9 |
| Ash | 6.3 |
| Phosphorus | 0.17 |
| Potassium | 2.00 |
| Sulfur | 0.08 |
| Calcium | 1.20 |
| Magnesium | 0.30 |
| Sodium | 0.07 |
| Iron | 0.03 |
| Chloride | 0.50 |

Also contained were smaller amounts of manganese, zinc, cobalt, copper and iodine. The alfalfa hay of this example contained the same amino acids as the batch of alfalfa hay used in Example 1 but in lower concentrations.

Because the alfalfa hay of this example contained only about 79 percent as much protein on a dry basis as the alfalfa hay of Example 1, the amount of supplement used was accordingly increased to maintain a nutritionally constant feedstuff by increasing the supplement feed rate to about 890 pounds per hour. Supplement had the same composition as in Example 1. The feed rate of alfalfa hay remained at about 3 tons per hour. Operating conditions were controlled as in Example 1. Product samples were withdrawn at sample point 24 at 5 minute intervals to assure homogeneity of results. Analyses of samples are given as weight percent on protein equivalent, phosphorus, sulfur and moisture with regard to time in the 120 minute test as follows:

| Time | Protein | Phosphorus | Sulfur | Moisture |
|---|---|---|---|---|
| 5 min. | 26.9 | 0.70 | 0.30 | 8.8 |
| 25 min. | 27.9 | 0.70 | 0.38 | 8.6 |
| 75 min. | 28.0 | 0.73 | 0.36 | 8.7 |
| 100 min. | 28.1 | 0.74 | 0.38 | 8.8 |
| 120 min. | 27.5 | 0.72 | 0.37 | 8.4 |
| Average | 27.7 | 0.72 | 0.36 | 8.6 |

In this example, the amount of suncured alfalfa hay weighed into the system during the 120 minute test period was 11,900 pounds. The amount of feed supplement concentrate used during the 120 minute test period was 1773 pounds as measured by decrease in the feed tank level. The amount of pelleted supplemented ruminant feed collected in the product hopper 27 was 11,511 pounds. Recovery of protein equivalent through the process was about 100 percent. Pellet strength average somewhat greater than the pelleted product of Example 1. Comparing the overall results demonstrated in Examples 1 and 2, a strong pelleted feed product with constant nutritional value was produced with protein value held at 27.0 to 27.7 percent when protein content of crude feed material decreased from 15.1 to 11.3 percent. Pellet strength increased with the addition of the supplement.

EXAMPLE 3

This example demonstrates supplementation of the whole corn plant into a nutritionally acceptable feed which is suitable for use as a major part of a cattle feeding ration and the use of a supplement liquid containing suspended solids. The overall process was carried out substantially as described in Example 1. The corn plants were harvested at the early dent stage and consisted of about 50 percent yellow corn, 25 percent stalk, 12 percent leaves, 10 percent cobs, and 5 percent shucks by weight.

The whole corn plants were brought from the field to the feed plant and passed through the feed supply and chopper 1 where corn plant was reduced to particles of workable size and tramp material was removed. Analysis of the corn plant was as follows:

| Component | Weight Percent |
| --- | --- |
| Moisture | 65.0 |
| Protein | 2.5 |
| Fat | 0.8 |
| Ash | 1.5 |
| Phosphorus | 0.7 |
| Calcium | 0.2 |
| Sugars (chiefly polysaccharides) | 1.6 |
| Carbohydrates (polysaccharides) | 22.3 |

The liquid feed supplement used was made by mixing the following ingredients:

| Ingredients | Weight Percent In Mix |
| --- | --- |
| Solution A | 30.0 |
| Ammonium Sulfate, Crystals | 10.0 |
| Aqueous Urea Liquor (65% urea) | 40.0 |
| CaCO₃ (powdered limestone) | 5.0 |
| Water (total moisture 42.0%) | 15.0 |
|  | 100.0 |

Since the supplement contained some suspended solids, the supplement stored in liquid supplement supply 3 was stirred to prevent settling of the solids. The liquid feed supplement contained 106 percent protein equivalent and was composed as follows:

| Component | Weight Percent |
| --- | --- |
| Nitrogen | 17.1 |
| Protein Equivalent | 106.0 |
| Phosphorus | 4.6 |
| Sulfur | 2.5 |
| Calcium | 2.0 |

The processing plant was started operating at a rate of about 5 tons per hour of chopped whole corn plant and about 1,000 pounds per hour of liquid feed supplement, with rates held as constant as possible throughout the two hour test period. Product samples were withdrawn from sample point 24 at 5 minute intervals to assure that equipment operation was constant throughout the test. Analyses made on these samples are given as weight percent with regard to time as follows:

| Time | Protein | Phosphorus | Moisture |
| --- | --- | --- | --- |
| 5 minutes | 28.8 | 2.4 | 8.4 |
| 25 minutes | 28.6 | 2.6 | 8.1 |
| 75 minutes | 29.1 | 2.5 | 8.5 |
| 100 minutes | 29.8 | 2.2 | 8.7 |
| 120 minutes | 29.2 | 2.7 | 8.7 |
| Average | 29.1 | 2.5 | 8.5 |

Combustion gases 13 fed to dryer 9 were maintained at about 2900°F. to permit efficient removal of water from the wet corn plant and the supplement.

The amount of whole corn plant weighed into the system during the 120 minute test period was 20,080 pounds, and the amount of feed supplement concentrate was 2100 pounds as measured by the decrease in the feed tank level. The amount of pelleted, supplemented ruminant feed collected in the product hopper 27 was 8,400 pounds.

Recover of protein equivalent through the process was 93.4 percent. The corn pellets, thus produced, were hard and not subject to dusting or fracture during normal handling. The surface was surprisingly able to hold a soybean oil additive containing aureomycin and other medicinals applied at a 1 percent level without becoming sticky or difficult to handle. The 1 percent medicinal soybean oil application was made by spraying directly on the pellets as they were discharged by belt conveyor from the pellet cooler.

EXAMPLE 4

This example demonstrates that it is not necessary to utilize substantially pure urea as a source of amide nitrogen in the present invention. For this test, a mixed amide source was prepared by partial pyrolysis of urea to form biuret in accordance with known procedures, followed by addition of water and attapulgite clay to the pyrolyzate. Composition of the resulting mixture, which for convenience will be called "liquid amide source", was as follows:

| Component | Weight Percent |
| --- | --- |
| Biuret | 19.1 |
| Urea | 43.4 |
| Clay | 2.0 |
| Water | 34.5 |
| Triuret | 0.2 |
| Cyanuric Acid | 0.8 |
| Total Nitrogen 27.85% (wt.) | |
| Protein Equivalent 174% (wt.) | |

Alfalfa used in this example was harvested in central Nebraska in the fall. The composition of the alfalfa was, as follows:

| Component | Weight Percent |
| --- | --- |
| Protein | 5.65 |
| Moisture | 71.8 |
| Fat | 0.9 |
| Ash | 2.7 |
| Polysaccharides | 19.0 |

These polysaccharides are of two general types: those that form the skeletal structure of the plant and those that constitute reserve sources of simple sugars. Both types of polysaccharides are high molecular weight polymers, built up from single pentose and hexose units. The polysaccharides present in this particular feed were primarily of the insoluble type. The reserve sugar source polysaccharides amounted to 2.5 percent (weight) of the feed.

Processing was similar to processing in Example 1. When the alfalfa arrived at the conversion plant, it was dumped into the supply system which shredded the alfalfa plants into small pieces so that sufficient surface would be available for rapid reaction with the amides. The alfalfa fodder was then continuously transmitted to the blender where the liquid amide source, superphosphoric acid and the alfalfa were blended to form a homogeneous mixture which was acidic (pH about 2). The plant was operated for eight hours with the following feed rates: alfalfa-2,000 lbs./hr.; acid-4.5 lbs./hr. (containing ortho- and polyphosphoric acid). Analysis of the superphosphoric acid catalyst was as follows:

| Component | Weight Percent |
| --- | --- |
| $P_2O_5$ | 73.0 |
| Percent of total $P_2O_5$ as Polyphosphate | 71.7 |
| F | 0.13 |
| $Fe_2O_3$ | 1.15 |
| $Al_2O_3$ | 0.81 |
| MgO | 0.20 |
| $SO_4$ | 2.75 |

The blended reactants were fed by means of a screw feeder into the continuous direct gas fired rotary dryer (which is also a reactor) operating at essentially atmospheric pressure. The dryer-reactor was operated to allow entrance of reactants in one end and discharge from the other with back mixing minimized so that careful control was maintained over the amount of water removal. Enough moisture was maintained throughout the dryer to allow hydrolysis-degradation of the polysaccharides without charring the product. Discharge temperature of the solids was maintained at 190°F. and moisture content of the reacted material was maintained at 8.1 percent. The remaining moisture which had entered with the feed materials was continuously discharged with the combustion gases. Samples withdrawn from the dryer solids stream reduced Fehling's solution indicating presence of potential aldehydic groups. The reducing character of the intermediate indicates presence of cellobiose and maltose type structures.

The partially reacted and free-flowing alfalfa fodder was continuously discharged from the rotary dryer. This intermediate product had a dry appearance and low density with a high surface area. Onto this material was continuously sprayed residual cane molasses at 140°F. at a rate of seven pounds per hour. The molasses was concentrated, containing about 65 percent of polysaccharides, about half of which were water-soluble disaccharides. Molasses readily reduced Fehling's solution indicating presence of carbonyl groups which undergo aldehydic condensations.

The mixture containing the partially reacted amides and polysaccharides was charged to the pellet mill where small portions of the mixture were nearly instantaneously compressed to 5,000 psig, and the temperature increased to 215°F. The product was immediately discharged from pressure zone of the mill to an insulated area operating at atmospheric pressure. In this area the reaction between the partially degraded saccharides and amides was allowed to continue adiabatically and the temperature increased to 250°F. in fifteen minutes retention time. The agglomerated particles, about ⅜ inch dia.×½ inch long were then cooled. The cooled agglomerate had a hard homogeneous surface and good particle strength.

The amount of agglomerated product recovered was 629.2 lbs./hr. and product composition was as follows:

| Component | Weight Percent |
| --- | --- |
| Protein Equivalent | 24.4 |
| (Nitrogen) | 3.9 |
| Phosphorus (As $P_2O_5$) | 0.5 |
| Moisture | 5.8 |

Of the total amount of nitrogen fed, 24.6 lbs./hr. were recovered as usable product for an overall protein equivalent yield of 97.6 percent. No ammonia fumes were detected during the operations. The small losses incurred appear to be handling and dust losses.

EXAMPLE 5

This example demonstrates the efficacy of the product of the invention as a protein substitute in ruminant feeds.

Part of product made in Example 4 was taken for evaluation against the same nitrogen sources in untreated form. The tests were carried out in the laboratory using standard in-vitro techniques and were run using four samples of each material. Rumen fluid was freshly withdrawn from a rumen-fistulated Jersey steer, and was diluted with water and phosphate buffer. All samples were prepared so that each had the same nitrogen content, 1,800 micrograms in each 2 ml. test sample.

After the nitrogen products were added to the test samples, small samples were taken initially and hourly for three hours. The ammonia nitrogen was separated from each sample by diffusion and then analyzed. Results of the tests are shown in Table I.

TABLE I

| | Total Ammonia Nitrogen ($NH_3$—N) Microgram/Milliliter at Indicated Times — Hours | | | |
| --- | --- | --- | --- | --- |
| Feed Supplement | 0 hrs. $NH_3$—N | 1 hr. $NH_3$—N | 2 hrs. $NH_3$—N | 3 hrs. $NH_3$—N |
| Urea-Biuret-Clay Liquid Used in Example 4 | 6.16 | 293.9 | 587.6 | 991.4 |
| Feed Pellets Produced in Example 4 | 45.7 | 147.9 | 147.9 | 149.7 |

From these results it may be seen that although the same amount of nitrogen was added to each sample of rumen fluid, product prepared by the procedure of Example 4 gave a more constant supply of ammonia nitrogen which could be efficiently used by the animal, while urea added without treatment allowed quick release of ammonia in the rumen fluid to a level which could cause serious toxicity problems.

EXAMPLE 6

The following example demonstrates the efficacy of the product of the invention as a slow-release nitrogen source in water.

Uncrushed and unfragmented ⅜ inch diam.×½ inch pellets of the product of Example 4 were weighed analytically, 15 grams, and added to 250 ml. beakers. A total of 150 ml. distilled water was added, the contents swirled gently and then left undisturbed for the period of the soak test. After the soak period, the contents were again swirled to obtain a homogeneous liquid phase and 100 ml. of liquid removed with a pipette, drawing as little as possible of the suspended solids into the pipette. Contents of the pipette were filtered through medium porosity glass frit vacuum filter to remove any solids withdrawn. The filter was washed with several 10–15 ml. portions of cold water and all of the filtrate was transferred with rinsing to Kjeldahl flask. Nitrogen was determined on the contents of the Kjeldahl flask by the standard A.O.A.C. method. The percent N released from the sample with soaking was then calculated on the basis of original sample weight. A total of twenty samples of product from Example 4 were used to obtain nitrogen release data at different time periods as shown in Table II.

TABLE II

| Sample Description | Percent of Total Nitrogen Released from Sample with Soaking | | |
|---|---|---|---|
| | 15 min. | 30 min. | 1 hr. |
| Product from Example No. 4 | 16 | 19 | 28 |

EXAMPLE 7

This example demonstrates use of the product of the invention as a plant food.

A turf of perennial rye grass in 15 inches×15 inches×4 inches deep trays was fertilized by applying the product from Example 4 to the soil surface at the rate of 200 pounds of nitrogen per acre. For comparative performance uncoated urea pellets and ammonium sulfate crystals were also applied at the same nitrogen rate to grass in similar trays. Each grass tray was leached twice to simulate a 1.5 inch rainfall (one week after fertilizing and 6 weeks after fertilizing). The approximate amount of water draining from each of the trays was 750 ml. Grass in each tray was clipped periodically and the clippings were then dried and weighed. Yield of dry grass from the various fertilizers with time are tabulated in Table III.

TABLE III

| Yield of Dry Grass from Fertilized Trays, Grams | | | |
|---|---|---|---|
| Time of Clipping Days after Fertilization | Example 4 Product | Uncoated Urea | Ammonium Sulfate |
| 4 | 2.0 | 1.9 | 1.3 |
| 14 | 6.3 | 5.3 | 4.4 |
| 21 | 5.7 | 6.0 | 6.7 |
| 27 | 5.8 | 6.3 | 6.2 |
| 35 | 5.8 | 6.8 | 7.0 |
| 45 | 4.7 | 5.5 | 6.8 |
| 60 | 6.5 | 5.0 | 6.0 |
| 72 | 5.2 | 2.4 | 2.2 |
| 90 | 5.2 | 2.7 | 2.5 |
| 110 | 5.5 | 2.4 | 1.0 |

This test shows that the product from Example 4 supplies plant food over an extended period of time and released nitrogen much slower than either urea or ammonium sulfate. The safety of use of the Example 4 product was demonstrated by the fact that no burning, as indicated by the yellowing of the grass blades, was observed even at the rather high application rate used. There was evidence of some burning with the urea and ammonium sulfate.

EXAMPLE 8

The pelleted product of the present invention is essentially an agglomerated material. As compared with Example 6, this example shows the effect of agglomeration on the nitrogen release properties of the pellets.

A sample of the pelleted agglomerated product from Example 4 was comminuted in a Waring Blender to a very small particle size. The resulting powder was then analyzed for cold water soluble and insoluble nitrogen by A.O.A.C. procedures. Results are summarized in Table IV.

TABLE IV

| Product | Total Nitrogen Content—Wt.% | Cold Water Insoluble N—% of Total N | Cold Water Soluble N—% of Total N |
|---|---|---|---|
| Comminuted Example 4 Product | 3.90 | 61.8 | 38.2 |

This example shows that 38.2 percent of the total nitrogen in the finely ground product from Example 4 is immediately available to either animals or plants as water soluble nitrogen, and that 61.8 percent of the nitrogen is slow-release nitrogen. By comparison of these results with results shown in Example 6, the release improvement obtained by agglomeration is demonstrated, i.e., Example 6 showed only 16 percent of the total nitrogen as water-soluble nitrogen after soaking pellets for 15 minutes in water.

EXAMPLE 9

This example demonstrates the conversion of whole corn plants and complete liquid feed supplement into slow-release nitrogen for animal feeds, using ammoniated superphosphoric acid (Solution A) for reaction catalyst. A stand of whole corn plant was harvested in central Nebraska in the fall. Total plant consisted of about 50 percent yellow corn, 25 percent stalk, 12 percent leaves, 10 percent cobs, and 5 percent shucks by weight.

The corn plants were brought to the conversion plant used in Example 1 two days after field cutting. Analysis of the corn plant was as follows:

| Component | Weight Percent |
| --- | --- |
| Protein | 2.5 |
| (Nitrogen) | 0.4 |
| Moisture | 67.0 |
| Fat | 0.8 |
| Sugars (polysaccharides) | 1.6 |
| Carbohydrates (polysaccharides) | 22.3 |
| Ash | 1.5 |

After shredding, liquid supplement was added continuously in a fodder-amide blender with the total supplement added per ton of corn plant fed amounting to 110 pounds. The composition of the liquid feed supplement, given as pounds of ingredients per ton of liquid feed supplement is as follows:

| Component | Pounds/Ton Supplement |
| --- | --- |
| Solution A | 322.0 |
| Ammonium Sulfate | 20.0 |
| Cane Molasses | 700.0 |
| Urea | 463.6 |
| Sodium Chloride | 140.0 |
| Copper Sulfate | 0.44 |
| Manganese Sulfate | 1.44 |
| Cobalt Sulfate | 0.08 |
| Zinc Sulfate | 1.44 |

After blending, the corn plant-supplement mixture was heated at atmospheric pressure in the continuous rotary dryer (or reactor) about five minutes at 200°F. to activate the polysaccharides by partial decomposition, partial drying, and reaction with the urea.

Discharging from the rotary reactor, a sample showed moisture to be 8.8 percent and test showed that product would reduce Fehling's solution, indicating presence of aldehydic acting carbonyl groups. The product appeared to be dry and felt only slightly sticky to the touch.

This material was continuously moved forward to the high temperature and pressure pellet mill which served as an agglomeration reactor. The mixture was taken instantaneously to 6,000 psig and heated to 226°F. and then discharged to an insulated area not shown in the drawing, where the reaction was allowed to continue adiabatically for fifteen minutes. The temperature increased to 235°F. before the product was cooled to hard, shiny particles ⅝ inch diam. and about ¾ inch long. Product composition obtained was as follows:

| Component | Weight Percent |
| --- | --- |
| Protein Equivalent | 14.8 |
| Phosphorus (as $P_2O_5$) | 1.2 |

The amount of nitrogen fed to the process totalled 21.6 pounds per hour per ton of corn plant fed over an 8 hour period of operation and the amount of nitrogen recovered in the final hard pelleted product amounted to 19.7 pounds per hour per ton of corn plant fed, giving a protein equivalent recovery efficiency of 91.2 percent. The total amount of product recovered during the eight hour operating period was 834 pounds per hour per ton corn plant fed.

EXAMPLE 10

The following example demonstrates that the product of the present invention is non-toxic to ruminants.

The toxic level of urea in sheep has been reported by various authorities. There is considerable evidence reported in the literature that urea intake levels of about 15 grams per 100 pounds of animal weight in a single feeding results in serious toxicity and usually death of the animal.

Four sheep ranging from 100 to 110 pound weights were taken off feed and starved for 24 hours in a pen enclosure. After the 24 hour period, the sheep were force fed 1 kilogram each of the product from Example 9. The amount of nitrogen fed to the sheep was equivalent to about 50 grams of urea per animal.

The animals were observed for 3 days and no sign of urea toxicity was noted in the animals. The animals were slaughtered in ten days and no abnormalities were noted during examination of the carcasses.

EXAMPLE 11

The agglomerated produt made in Example 9 was tested in the laboratory for ammonia release rate against the liquid feed supplement used to supply the synthetic nitrogen in Example 9. The evaluations were made using standard in-vitro techniques and the tests were made as described in Example 5.

The results of these tests may be summarized as follows. The ammonia nitrogen release rate was clearly slowed in the agglomerated product and nitrogen concentration after reaching a level of 265 micrograms N per milliliter of rumen fluid leveled out, indicating a safe consumption level. The release rate was slightly higher with this material than that of Example 4, because the nitrogen source, a liquid feed supplement concentrate, contained some ammonium nitrogen. The liquid feed concentrate, per se, gave a rapid, and potentially hazardous ammonia release in the rumen fluid with the ammonia nitrogen level reaching about 1,000 micrograms per milliliter in 3 hours.

EXAMPLE 12

The feeding tests shown in this example were run to demonstrate the effectiveness of the instant process for reacting and agglomerating synthetic amides such as urea and biuret, slowing their release in ruminants, and thereby protecting ruminants from accidental overdoses of synthetic nitrogen. The techniques used in this example are not proposed as a suitable feed regimen for ruminants.

The toxic dose of urea in a single feeding has been reported to be about 70 grams for cattle, and there has been considerable data reported in animal feed and veterinary literature which indicate intake of 100 grams or more of urea will cause serious toxicity, usually resulting in death of the animal.

Three Black Angus heifers, weighing about 600 pounds, consumed four pounds/day of product prepared by the method of Example 4, except that it contained 37 percent protein equivalent, compared to the 24.4 percent protein equivalent of Example 4. This quantity of feed amounted to consumption of the equivalent of 230 grams of urea per day on a volunteer basis. The animals showed no sign of toxicity through the three day test period.

A fourth Black Angus heifer weighing about 600 pounds was fed 6 pounds of material made in the manner of Example 4, except that it contained 33 percent protein equivalent. The pelleted product was broken into pieces and force fed in a water slurry, almost instantaneously. This amount of feed particles contained the nitrogen equivalent of 313 grams of urea, but caused no signs of toxicity. The next day the same animal was fed more of the same feed particles in amount containing the nitrogen equivalent of 220 grams of urea, and the third day the same animal was fed more of the same feed particles in amount containing the nitrogen equivalent of 240 grams of urea. Throughout the test period the animal showed no signs of urea or ammonia poisoning. The animal was slaughtered ten days after the final ingestion of the test feed particles. Examination of the carcass showed no abnormalities.

A fifth Black Angus heifer was starved 48 hours. The animal then was force fed through a tube five pounds of broken, but not ground, feed particles similar to that produced in Example 9, except containing 28 percent protein equivalent. This one time ingestion of feed particle nitrogen was equivalent to 220 grams of urea. The animal showed no sign of toxicity.

A sixth Black Angus heifer from the same pen as the other five, and also weighing approximately 600 pounds, was used to demonstrate the fact that these animals are subject to urea poisoning. The animal was force-fed 140 grams of crystal urea in several gallons of water at 11:30 a.m. The animal showed signs of toxicity by noon and died from severe poisoning at 2:00 p.m.

DISCUSSION OF THE INVENTION

We have disclosed a novel composition which delivers synthetic nitrogen for safe and efficient use in agricultural environments without addition of undesirable materials to the environment. This composition is equally effective for delivery of synthetic nitrogen for plant foods or for safe delivery of synthetic nitrogen as a protein substitute in ruminant feeds.

The novel composition comprises acid catalyzed adducts of synthetic amide nitrogen compound, particularly urea and biuret, with natural, largely water-insoluble polysaccharides bound into durable particles by relatively small amounts of amide-carbonyl adducts.

The amide-carbonyl adducts for forming durable agglomerated particles are best made by partially degrading or hydrolyzing natural polysaccharides to the lower sugars which have carbonyl groups active enough for reaction with urea to form stable adducts.

The compositions of the invention may be produced from a wide variety of synthetic amide nitrogen compounds, and partially degraded natural polysaccharides.

Some additional water-soluble polysaccharide materials which are preferably highly concentrated and react readily with amides to form polymers, can be added to the basic composition to enhance fertilizer and feed uses. The superphosphosic acid compounds catalyzing the adduct formation are also useful as a primary nutrient in both animal and plant foods. Other materials which may be added during the formation of the durable particles include: potassium compounds, trace minerals, vitamins, or other natural materials such as proteins or fats.

The chief object of this invention is to produce a new controlled release nitrogen particulate product suitable for safe use in either animal feeds or plant foods, containing primarily adducts of natural polysaccharides and amides plus minor amounts of amide-carbonyl polymers to form physically strong particles.

The reaction products of the natural polysaccharides and amide compounds such as urea and biuret are made by hydrolysis or oxidative degradation of the polysaccharide material until reactive carbonyl groups are formed. The carbonyl groups then react with the amides to produce compounds which are stable through storage. It is necessary to heat the polysaccharides to achieve the necessary chemical reaction. Cellulosic material such as corn plants, alfalfa, bagasse, or sugar beet pulp can readily be used as the prime polysaccharide source. It is not necessary nor desirable that these primary constituents be completely reacted, but it is necessary that enough reaction occur to chemically bind appreciable amounts of the synthetic amide compound used.

The minor amount of amide-carbonyl polymers used to bind the primary constituents into physically strong and water resistant particles is produced by reaction of amides, such as urea, with concentraed partially hydrolyzed or oxidized polysaccharide-based carbonyl compounds. For example, cane molasses contains appreciable reactive carbonyl compounds which react under temperature and pressure to form compounds which cement the particles of the primary constituents together into tough resistant, particles of natural and synthetic ingredients which will slowly and safely yield back essentially all of the input ingredients on prolonged exposure to a microbially active agricultural environment. For formation of satisfactory controlled release polymer, presence of acid catalyst and elevated temperature is necessary. Agglomeration of the product under pressure is also important. The best results are obtained with superphosphoric acid (or its ammonium salts) because its ionization constant is high enough to bring about the polymerization without charring the product. Sulfuric acid can also be used, but it requires more careful temperature control to prevent charring of the product. Other strong mineral acids or ammonium salts thereof may be used, but care must be exercised to prevent degrading or poisoning the product. Small amounts of nitric acid may be used to speed oxidation-degradation of the polysaccharides.

Generally, the liquid feed supplement is formulated to provide a nitrogen to sulfur ratio of not more than 15 parts of nitrogen to 1 part of sulfur by weight and a nitrogen to phosphorus ratio not more than 8 parts of nitrogen to 1 part of phosphorus by weight, based on the total feedstuff.

We claim:

1. A process of preparing a nontoxic pelleted ruminant feed having high nutritional value and improved storage characteristics, which comprises:
   a. providing a liquid ruminant feed supplement comprising 4 to 8 percent by weight of a water-soluble sulfate, up to 20 percent by weight of molasses, 20 to 30 percent by weight of urea, and 15 to 25 percent by weight, on a dry basis, of an acid selected from the group consisting of superphosphoric acid, and aqueous ammoniated superphosphoric acid having a nitrogen content of about 9 to 12 percent by weight, a total phosphorus content measured as $P_2O_5$ of 28 to 38 percent by weight, and wherein polymeric phosphates represent about 30 to 70 percent by weight based on the total phosphorus content;

b. admixing said feed supplement with a solid natural ruminant feedstuff consisting essentially of water-soluble and water-insoluble polysaccharides and containing 25 to 75 weight percent of water, to impregnate the solid natural ruminant feedstuff and provide about 2 to 10 weight percent total nitrogen on a dry basis and provide an acid catalyst for hydrolysis of the polysaccharides to form aldehydic carbonyl groups reactive to urea;

c. drying and reacting the mixture from step (b) in a conventional gas fired dryer at a temperature within the range 180° to 240°F. for 5 to 60 minutes to obtain a dried, reacted, slow-release nitrogen product containing 6 to 12 percent by weight of water;

d. pelleting and agglomerating said dried impregnated solid feedstuff at a pressure of 500–20,000 psig while maintaining the temperature thereof at about 140° to 300°F.; and e. cooling the resulting pelleted product to ambient temperature to form hard pellets wherein 50 to 90 percent of the total nitrogen is water-insoluble nitrogen.

2. The process of claim 1 wherein the liquid feed supplement is formulated to provide a nitrogen to sulfur ratio of not more than 15 parts of nitrogen to 1 part of sulfur by weight and a nitrogen to phosphorus ratio of not more than 8 parts of nitrogen to 1 part of phosphorus by weight, based on the total pelleted feed.

3. The process of claim 1 wherein the solid ruminant feedstuff is selected from the group consisting of alfalfa and corn plants.

4. The process of claim 1 wherein the pellet formation temperature in step (d) is 200° to 300°F.

5. The process of claim 1 wherein the pelleted product is cooled to ambient temperature in step (e) within about 1 to 60 minutes after pelleting in step (d).

6. The process of claim 1 wherein the watersoluble sulfate is ammonium sulfate.

* * * * *

UNITED STATES PATENT AND TRADEMARK OFFICE
CERTIFICATE OF CORRECTION

PATENT NO. : 3,873,734
DATED : March 25, 1975
INVENTOR(S) : John Francis Higgins et al.

It is certified that error appears in the above-identified patent and that said Letters Patent are hereby corrected as shown below:

Column 5, line 31, "nox-toxic" should read --non-toxic--.

Column 12, line 20, "Recover" should read --Recovery--.

Column 13, line 16, after "alfalfa - 2,000 lbs./hr.;", insert --liquid amide source - 44.6 lbs./hr.; and superphosphoric--.

Column 18, line 25, "produt" should read --product--.

Column 21, line 1, "38" should read --39--.

Signed and Sealed this thirtieth Day of September 1975

[SEAL]

Attest:

RUTH C. MASON
Attesting Officer

C. MARSHALL DANN
Commissioner of Patents and Trademarks